UNITED STATES PATENT OFFICE.

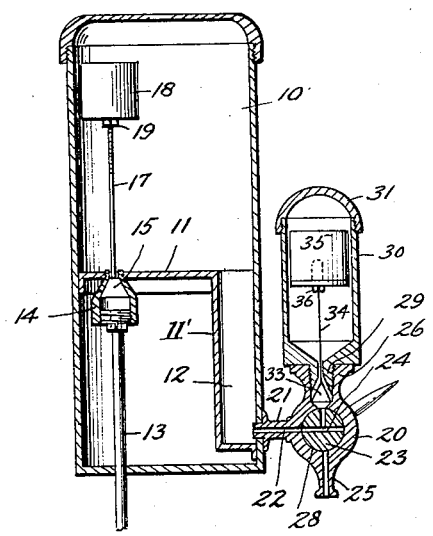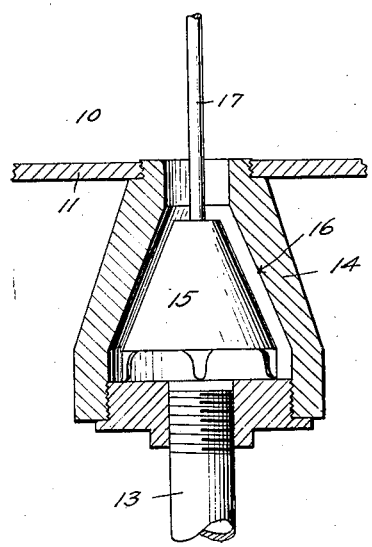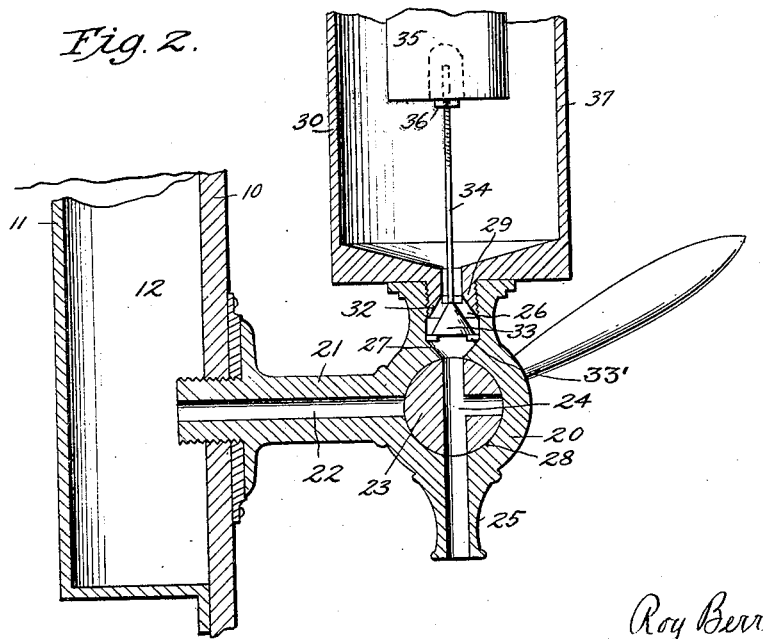

ROY BERRY, OF OLNEY, ILLINOIS.

SODA-FOUNTAIN LIQUID-DISPENSING APPARATUS.

1,370,082.  Specification of Letters Patent.  Patented Mar. 1, 1921.

Application filed April 14, 1920. Serial No. 373,854.

*To all whom it may concern:*

Be it known that I, ROY BERRY, a citizen of the United States, resident of Olney, in the county of Richland and State of Illinois, have made a certain new and useful Invention in Soda-Fountain Liquid-Dispensing Apparatus; and I declare the following to be a full, clear, and exact description of the same, such as will enable others skilled in the art to which it appertains to make and use the invention, reference being had to the accompanying drawings, and to letters or figures of reference marked thereon, which form a part of this specification.

This invention pertains to liquid dispensing apparatus, and has for its primary object to provide a liquid dispenser which may be attached to, or used in connection with a soda water fountain, or wherever a quantity of liquid is to be drawn, for supplying the exact amount of such liquid as may be necessary or desired.

To this end, the invention comprises a storage vessel which is automatically kept filled with the liquid to be dispensed, a container holding a fixed quantity of the liquid, which flows therein from the storage vessel, a manually operated control valve between the storage vessel and the container, a float controlled valve limiting the quantity of fluid entering the container, and a second float controlled valve in the storage vessel.

With the above and other objects in view, the invention comprises the novel combination and arrangement of parts hereinafter described in detail, pointed out in the appended claims and illustrated in the accompanying drawings, in which:—

Figure 1 is a central vertical sectional view of the improved dispenser,

Fig. 2 is an enlarged sectional view of the manually operated control valve and float controlled valve for the container, and Fig. 3 is an enlarged sectional view of the float controlled valve for the storage vessel.

In the accompanying drawings illustrating the invention, the numeral 10 designates a reservoir or storage vessel for liquid to be dispensed, being provided with a horizontal partition 11, and a vertical partition 11' at one side thereof, the latter forming part of a bottom well or pocket 12, of reduced cross sectional area.

The reservoir is kept constantly filled with liquid to be dispensed by means of a supply pipe 13, connected at its inner end with a valve casing 14, engaging an opening of the horizontal partition 11, said supply pipe having at its outer end connection with a receptacle containing liquid under pressure. Or, as will be obvious, said receptacle may be elevated above the reservoir 10 and feed thereto by gravity.

Within the valve casing 14, is a valve 15, adapted to close upwardly against a seat 16 of the said casing, and when in lower or open position, to permit the liquid to pass from the supply pipe into the reservoir 10.

The valve 15, is provided with a rod or stem 17, connecting the same with a float 18, located in said reservoir, said rod having a nut 19, threaded upon the upper end thereof and adjustable to adjust the float vertically.

When the liquid rises in the reservoir 10 to a level determined by the vertical adjustment of the float, the rising of the float will close the valve 15, and cut off the inflow of liquid from the supply pipe. Withdrawal of any quantity of liquid from the reservoir, will lower the float and open the valve 15, to admit an amount of liquid equal to that withdrawn.

20 is a valve casing provided with a lateral tubular extension 21, having a bore 22, and engaging a perforation of the lower portion of said pocket or well 12, a valve 23 working in said casing and having a T-shaped or three-way port 24, adapted to connect the bore 22 of said lateral extension with either a lower discharge tubular extension 25 of said casing, or with a valve chamber 26, located in an upper tubular extension 27 of said casing.

A lower nipple 29 of a measuring vessel 30, is screwed within the valve chamber 26 aforesaid, and is provided with a lower valve seat 32, a valve 33 working in said chamber and normally resting upon lower lugs 33' in open position, and being adapted to engage said seat to close the passage from said valve chamber to said measuring vessel.

Working within the measuring vessel is a float 35, having a rod or stem connection 34, with the valve 33, said stem working loosely in the aperture of said nipple, the bottom of said float being located approximately on a level with the upper end of said well 12, or with the bottom 11 of the reservoir. The valve 23 is a ball valve, working in a seat 28, of the casing 20. The measuring vessel is provided with a top 31, having an air vent, and the float 35 has a threaded connection with the rod 34 for vertical adjustment, a nut 36 being engaged with the thread of said rod to fix the adjustment.

In operation, after connecting the supply pipe 13 with a suitable receptacle containing a quantity of liquid to be dispensed, the liquid under sufficient pressure will flow to the reservoir 10. If the latter be empty or only partly filled, the weight of the valve 15 and float 18 will be sufficient to lower the valve, as shown in Fig. 2, and permit the liquid to enter the storage vessel. As the liquid rises in the storage vessel and approaches the top, the float 18 will be lifted, which raises the valve 15 to its seat and stops the flow of liquid when the predetermined amount has entered the storage vessel, this amount being fixed by the position of the float on the valve stem. The valve plug 23 of the control valve 20 is normally in the position shown in Fig. 1 to permit liquid from the storage vessel 10 flowing through the passage 22 in the valve stem 21, port 24 of valve plug, passageway 27 and, if the conical valve 33 be open, through the tubular nipple 29 into the container 30. The liquid rises in the container and lifts float 35 when the determined amount has entered, thus closing valve 33. The capacity of the measuring vessel 30 and the position of the float 35 will be so portioned that only sufficient fluid for one charge can enter before the valve closes. When a charge is to be drawn, the salesman turns the valve plug 23 to the position shown in Fig. 2, thereby closing the bore 22 in the stem 21 and connecting through port 24 the passageway 27 with the nozzle 25. The weight of the liquid in the said vessel will then open the valve 33 and permit the liquid to flow from the vessel through the nozzle. When the measured quantity has been dispensed, the control valve is turned to first position, closing the nozzle and opening the bore 22, whereupon the vessel will be automatically refilled from the reservoir 10 and the latter from the supply pipe. The measuring vessel 30 will preferably be made large enough to hold the maximum charge of liquid usually sold at a soda water fountain. When smaller charges are to be dispensed, it is only necessary to lower the float 35 on the rod 34 to a point where it will close the valve 33, when the desired quantity of liquid has entered the container. By this means, an ounce or one half ounce of liquid can be measured in a vessel holding a pint or more. The position of the float determines the quantity of fluid which can be drawn at a charge.

This apparatus is simple, cheap, accurate and automatic in its operation, always dispensing the same amount each time the valve plug is turned. With the float 35 set to close valve 33 when one charge has entered the container, there is no possibility of more liquid being dispensed than the one charge.

In applicant's construction, wherein a vented supply tank is provided, it will be apparent that the three-way valve 23 and the valve 33 will be relieved from the pressure under which the main supply of liquid is kept; whereby tendency to leakage of the valve 23 is minimized and any tendency of the valve 33 to close under excessive pressure upon the bottom thereof will be overcome, since the weight of the column of liquid in said tank is insufficient to close the valve 33 in the passage of the liquid past said valve.

The reservoir 10 can be filled by hand, if desired, and the dispenser will operate just as well by a gravity feed as by a pressure feed.

Obviously the gravity feed dispenser would be of simple nature and comparatively inexpensive, filling the need of small stores where an expensive outfit could not be installed.

Having thus described the invention, what is claimed is:—

1. In a liquid dispenser, a reservoir, a valve casing having a lateral tubular extension connected with the lower portion of said reservoir, an upper tubular extension provided with a valve chamber, and a lower tubular discharge extension, a measuring vessel having a lower nipple engaging within said upper extension and having a lower valve seat forming the top of said chamber, a float in said vessel, a valve in said chamber having a stem connection with said float, and a valve in said casing adapted to connect said lateral extension with said upper extension in filling said vessel, and alternatively to connect said upper extension with said discharge extension.

2. In a liquid dispenser, a reservoir having at one side thereof a bottom well of reduced cross sectional area, a valve casing having a lateral tubular extension connected with the lower portion of said well, an upper tubular extension provided with a valve chamber, and a lower tubular discharge extension, a measuring vessel having a lower nipple engaging within said upper extension and having a lower valve seat forming the top of said chamber, a float in said vessel, a valve in said chamber having a stem connection with said float, and a valve in said casing adapted to connect said lateral extension with said upper extension in filling said vessel, and alternatively to connect said upper extension with said discharge extension, the upper end of said well being located approximately on a level with the bottom of said float.

3. In a liquid dispenser, a reservoir having a horizontal partition, provided with an opening, a valve casing located below said partition and engaging said opening, a float in said reservoir, a valve in said casing having a stem connection with said float, a supply pipe connected with the bottom of said casing, said reservoir having at one side thereof a vertical partition and a bottom well of reduced cross sectional area of which said vertical partition forms a part, a valve casing having a lateral tubular extension connected with the lower portion of said well, an upper tubular extension provided with a valve chamber, and a lower tubular discharge extension, a measuring vessel having a lower nipple engaging within said upper extension and having a lower valve seat forming the top of said chamber, a float in said vessel, a valve in said chamber having a stem connection with the last named float, and a valve in the last named casing adapted to connect said lateral extension with said upper extension in filling said vessel, and alternatively to connect said upper extension with said discharge extension, the upper end of said well being located approximately on a level with the bottom of said float.

In testimony whereof I affix my signature in presence of two witnesses.

ROY BERRY.

Witnesses:
  ESTHER BOSART,
  EDW. SUESS.